Dec. 19, 1967  M. V. DADD  3,358,658
LUBRICANT FLOW METERING MEANS FOR ENGINE
ROCKER ARM LUBRICATION SYSTEM
Filed Feb. 14, 1966  2 Sheets-Sheet 1

INVENTOR.
MORRIS V. DADD
BY
ATTORNEYS

Dec. 19, 1967  M. V. DADD  3,358,658
LUBRICANT FLOW METERING MEANS FOR ENGINE
ROCKER ARM LUBRICATION SYSTEM
Filed Feb. 14, 1966  2 Sheets-Sheet 2
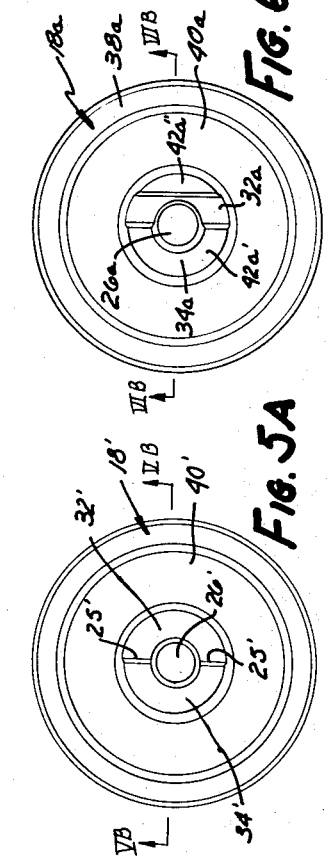
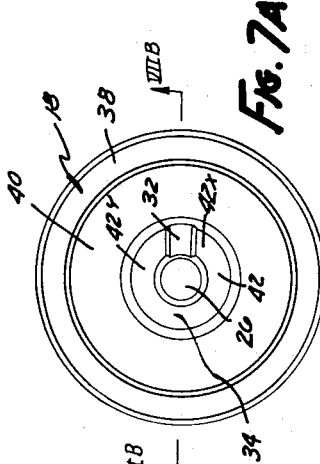
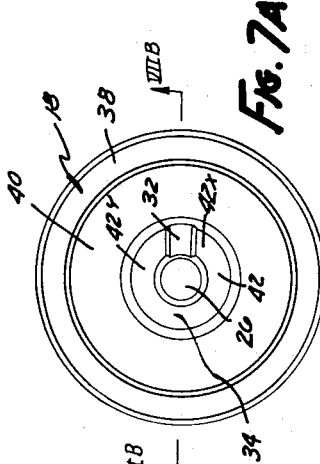
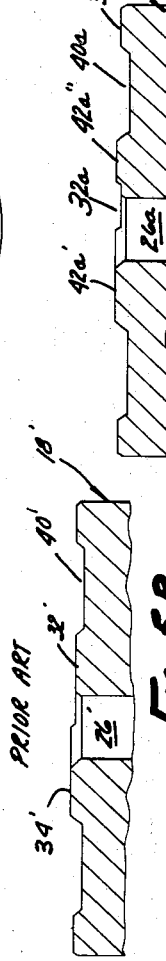
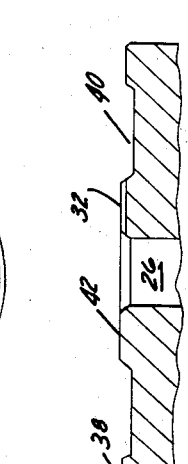
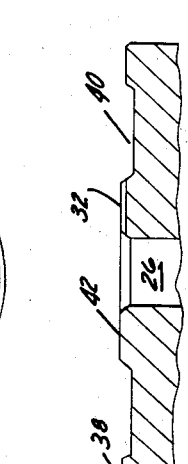
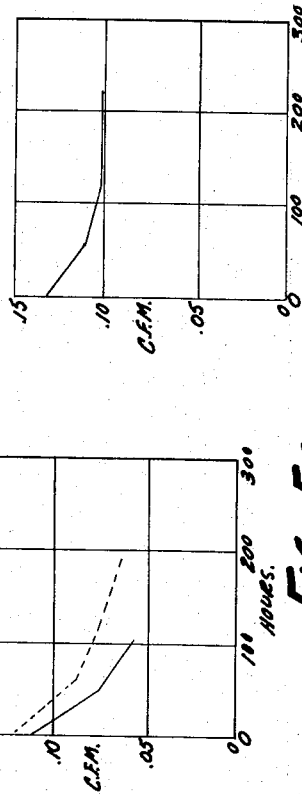
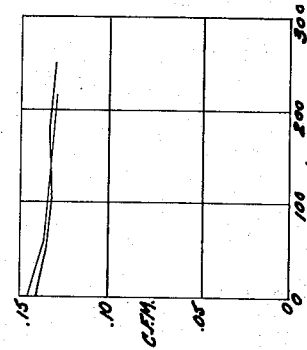
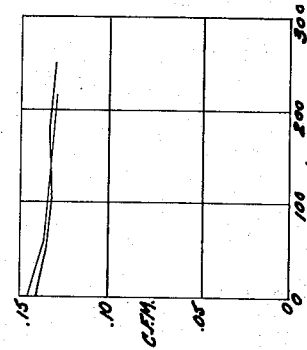
INVENTOR.
MORRIS V. DADD
BY
ATTORNEYS

United States Patent Office 3,358,658
Patented Dec. 19, 1967

3,358,658
LUBRICANT FLOW METERING MEANS FOR ENGINE ROCKER ARM LUBRICATION SYSTEM
Morris V. Dadd, Muskegon, Mich., assignor to Johnson Products, Inc., Muskegon, Mich., a corporation of Michigan
Filed Feb. 14, 1966, Ser. No. 527,211
6 Claims. (Cl. 123—90)

This invention relates to engine lubrication systems, and more particularly to means for regulating flow of lubricant oil through a hydraulic tappet assembly to the hollow push rod and rocker arm of a valve train.

This invention is an improvement of the invention in U.S. Patent No. 3,128,749 and its reissue Patent No. Re. 25,974. The combination in the above patents, i.e. of a simple metering disc specially interfitted with the orificed protruding nose of a push rod seat member, has proven extremely advantageous and has been widely accepted commercially. This combination performs the regulated lubricant metering action in an extremely reliable fashion, being free of plugging tendencies because of its rotational action, having freedom from breaking parts due to its complete simplicity, having rapid response to pressure conditions, and other advantages, many of which have been spelled out in the early patents referred to above.

The most commercially successful form of this patented tappet assembly has been that shown in FIGS. 7 and 8 of U.S. Patent No. 3,128,749, and shown as "prior art" in FIG. 5A in this application. This assembly uses a basically flat metering disc (allowing up to about 0.0004-inch tolerance variation in concavity) combined with a push rod seat member having a nose that has a semi-annular land portion and a shallow (i.e. 0.0010–0.0015 inch) semi-annular cutaway flow passage, with these two semi-annular portions defining an annulus around the passageway in the push rod seat member.

Extensive usage of this unique construction substantiates all of the noted advantages, but shows one particular undesirable factor which develops after an extended period of usage. More specifically, after 100–200 hours' operation of the novel assembly, at extremely high engine speeds, wear of the push rod seat in the nose area causes the lubricant flow through the semi-annular cutaway portion and adjacent the metering disc to actually diminish significantly to ½ or less of the initial flow rate and in fact to continue to diminish until flow is almost completely stopped after several hundred hours' operation.

Hence, extensive experimentation has been conducted since discovering this factor, in efforts to devise modifications of the patented assembly that would have all of the noted advantages of this prior assembly, but would also maintain a flow rate at or near to the initial lubricant flow rate capacity, even after hundreds of hours operation. As a result of the experimentation, of analytical thinking and resulting conclusions formed as to the problem, of unique concepts as to the solution to the problem, and many hours spent in revising the structure, re-experimentation, and re-analysis, improved unique forms of the assembly were conceived, made, and proven, which are capable not only of the initial noted features but also of sustained operation at excellent flow rates. The unique improvements herein may actually appear structurally simple once they are explained in detail and completely understood. Indeed, their structural simplicity is one major advantage, in view of the substantial operational improvements achieved in the high precision, close tolerance equipment which is so relatively inexpensive to manufacture.

It is an object of this invention therefore to provide an improved tappet assembly lubricant metering means that is not only adaptable to high speed inexpensive manufacturing, is not only simple and reliable for metering lubricant flow, not only free of moving breakable components, but which also retains most of its initial lubricant flow capacity over an extended useful life of hundreds of hours. It has far greater wear capacity on the nose where the disc seats so that it can last several hundred hours at extremely high engine speeds before oil flow is significantly reduced with the nose orifice being partially closed off. It provides more surface wear area in the land portion of the nose surrounding the nose passageway. It has exhibited less chance of plugging by foreign material, after hundreds of hours of operation, since the previous one tended to have its passageway generally closed down and easily plugged after a long time period. The novel structure has a maintained self-cleaning action due to a slow relative rotation between the push rod seat member and the metering plate.

Another object of this invention is to provide the metering means having the above noted advantages and which also automatically accommodates manufacturing tolerance variations in the flatness of the metering disc, so that proper regulation occurs even if the metering disc is concave or convex by about 0.0004 inch. Thus, during assembly it does not matter if the slightly curved disc is placed with either side up in the tappet.

These and other objects of this invention will become apparent upon studying the following specification in conjunction with the drawings in which:

FIG. 5A is a bottom view of a valve seat member nose similar to the prior art unit;

FIG. 5B is a fragmentary enlarged, sectional view of the member in FIG. 5A taken on plane VB—VB;

FIG. 5C is a chart showing performance conditions of the structure in FIG. 5A;

FIG. 6A is a bottom view of the first form of the novel improved construction;

FIG. 6B is a fragmentary, enlarged, sectional view of the member in FIG. 6A taken on plane VI-B—VI-B;

FIG. 6C is a chart of a performance condition fo this first form in FIG. 6A;

FIG. 7A is a bottom view of the second form of push rod seat member showing the preferred form of the improved construction;

FIG. 7B is a fragmentary enlarged sectional view of the member in FIG. 7A taken on plane VII-B—VII-B; and FIG. 7C is a chart showing operational conditions of this second preferred form of construction in FIG. 7A.

Figure 2:
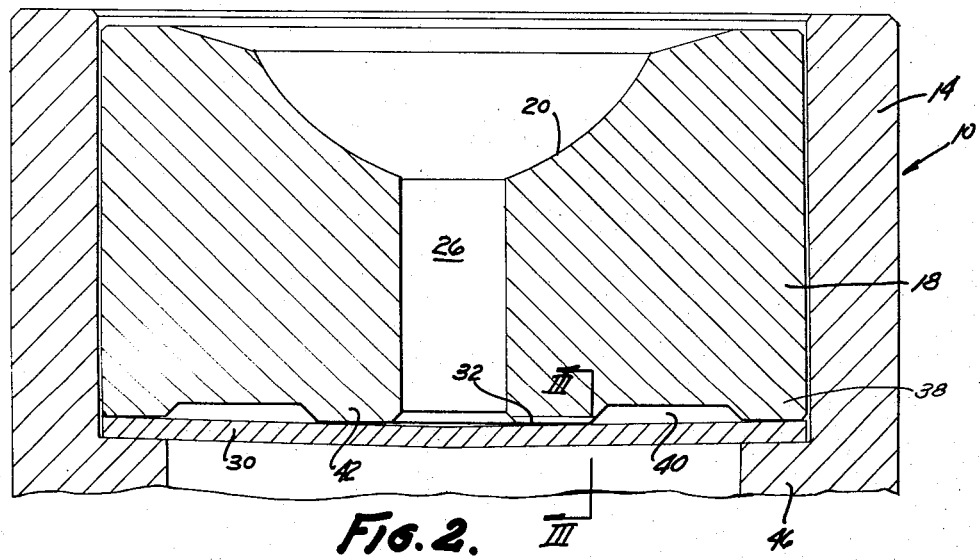
FIG. 2 is a greatly enlarged, fragmentary side elevational view of a portion of the apparatus in FIG. 1, showing the preferred form of the novel assembly of flow metering components.

Referring now specifically to the drawings, the valve tappet assembly 10 has a hollow body 12 with a lower end camming surface 13, and an open upper end to receive a hollow plunger 14 for reciprocable movement in the body. A passage groove 15 extends around plunger 14 to communicate to orifice 17 in plunger 14. The interior of hollow plunger 14 forms an oil reservoir 16 which is closed off at its upper end by a push rod seat member 18. This push rod seat member and a metering disc 30 are retained generally in engagement with each other by an underlying support means in the plunger, preferably in the form of an annular shoulder 46 formed in the inner diameter wall of plunger 14. Push rod seat member 18 is normally formed of sintered metal stock, hardened for increased durability. It has a concavity 20 in its upper surface, shaped to receive and interfit with the hemispherical lower end of a hollow push rod 22. The interior passage 24 through the hollow push rod communicates through an opening 28 in its end with a passageway 26 extending through the push rod seat member, preferably through the center thereof, i.e. from the center of seat surface 20 through the center of a bottom. The lower end of passageway 26 has a special relationship to metering disc 30 because of a special nose configuration on the under side of the push rod seat member 18, immediately surrounding the lower end of passageway 26.

Push rod seat member 18 preferably has a peripheral, annular, protruding rim or ridge 38 extending axially to abut the outer peripheral upper edge portion of metering disc 30. The opposite outer peripheral edge of the under face of disc 30 is engaged against retaining means or shoulder 46. This rim 38 encircles an adjacent annular groove 40 on the under surface of push rod seat member 18. This groove encircles an annular nose portion 42 which protrudes from the under surface of the push rod seat member, and in turn surrounds the central passageway 26.

Figure 4:
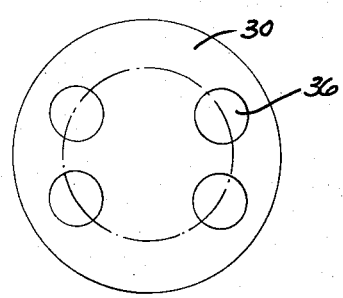
FIG. 4 is a plan view of the metering disc used in the assembly.

Metering disc 30 has a plurality of spaced apertures 36, preferably four in number and spaced in pairs as shown in FIG. 4, so that even if two such plates are accidentally installed in a tappet assembly instead of one, there is still a path for oil flow through the metering disc to the metering orifice on the push rod seat, and more specifically in its nose.

In the push rod seat member shown in FIG. 5A, the cutaway 32' is semi-annular, leaving a semi-annular "land" or protruding portion 34' on the prior art push rod seat member 18'. The member also has groove 40' and passageway 26'. Extensive usage of this prior art construction in vehicles has shown that after 100, 200, or so hours at extremely high engine speeds, the oil passage flow rate drops off markedly, often to ½ the initial flow rate or less. Thus referring to FIG. 5C, it will be noted that the initial flow rate in one test of an engine operating at 4400 r.p.m. dropped off from almost 0.12 cubic foot per minute of flow down to approximately 0.06 cubic foot per minute in 100 hours, and was still decreasing. Another test conducted under like conditions showed a flow rate which dropped from about 0.125 cubic foot per minute down to approximately 0.06 cubic foot per minute in 200 hours and was still decreasing.

Close analysis of this showed that the pressure on the edge 25' between the semi-annular land portion 34' and the semi-annular groove portion or passage portion 32' had extensive wear, which became so severe after several hundred hours that passage 32 was practically closed off due to almost complete wear down of land portion 34' beginning with edge 25' and proceeding outwardly away from passage 32'. The initial depth differential between protruding land portion 34' and adjacent passage 32' must be regulated to about 0.0010–0.0015 inch for proper initial flow rates. Therefore, there is a limit on the original depth which can be used.

Because of this substantially decreased flow action of the prior art type construction, and the conclusion reached regarding the nature of the wear problems, experimentation was conducted on different configurations for the nose portion of the valve seat member, in efforts to eliminate this wear characteristic. The result of the analysis, experimentation, re-analysis, and modifications in construction was first the improved construction shown in FIGS. 6A and 6B, and subsequently the preferred improved construction shown in FIGS. 7A and 7B.

Figure 3:
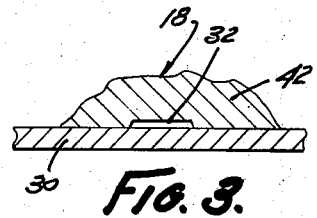
FIG. 3 is a fragmentary enlarged sectional view taken on plane III—III of FIG. 2.

Referring to the preferred form in FIGS. 7A and 7B, the push rod seat member 18 includes the outer peripheral annular rim or ridge 38, the adjacent annular groove 40, and the protruding nose portion annulus 42 surrounding the end of central passageway 26. The improved nose construction 42 basically has a generally annular configuration, with a land portion 34 that extends more than 270° around the annulus, and is interrupted by a relatively deep slot or ditch 32 that extends radially from passageway 26 to groove 40. The side boundaries on opposite sides of slot 32, adjacent the adjoining edges of land portion 34 are generally parallel to each other, extending in the same direction. In effect the slot 32 is bordered by oppositely positioned, slot straddling areas 42x and 42y of the protruding land portion 42. The entire land portion 42, including slot straddling areas 42x and 42y, is in one plane. The slot 32 is deeper than the semi-annular passage 32' of the prior art form, i.e. about 0.0030–0.0045 inch as compared to 0.0010–0.0015 inch, in order to obtain proper flow through the narrow slot. The slot has a width of about 0.050–0.060 inch. The increase in the area of land portion 42 is substantially 67% over the prior art device in FIG. 5A, and the depth increase of the narrow slot 32 is about 200% over the device shown in the prior art FIG. 5B. The land portion actually forms the support for a "bridge" astraddle the slot when combined with the metering disc 30, as shown by the sectional enlarged view FIG. 3. This slot-bridging action increases the useful life of the assembly remarkably. Extensive testing has shown results like those shown in FIG. 7C as typical. As shown, the flow through the passage decreases only a small percentage, i.e. only about 10% or less, of its initial flow rate, even after 225–250 hours. Furthermore, the rate of flow decrease after the first 50 hours or so is so insignificant that it reaches a state of equilibrium or a plateau, after which the flow decrease is almost nil. Thus even after 300–400 hours at extremely high engine speeds, the assembly will continue to function effectively. The useful life of the regulating means in the tappet assembly is increased many, many times over the prior art device.

In actual practice, due to manufacturing variations, the metering plate 30 may depart from absolutely flat condition to a slightly concave configuration on one face and convex on the opposite face (as shown in exaggerated form in FIG. 2). In other words, when these plates are stamped out of steel stock, the tolerance variation may cause them to vary up to 0.0004 inch from perfectly flat. Moreover, this variation is not readily visible so that the plates may be inserted one way in one tappet and the other way in another tappet. It has been found that this variation can be accommodated in the novel devices by causing the nose portion 42 of the push rod seat member to protrude, in a plane displaced from the plane of rim 38 by approximately 0.0003–0.0011 inch. Thus, if metering plate 30 is placed in the assembly in the position shown in FIG. 2, i.e. with its concave surface adjacent nose 42, it operates effectively, and likewise, if the convex surface of disc 30 is placed against nose 42, the nose merely deflects the plate in the opposite direction because of its slight protrusion past the plane of rim 38 to form it into the configuration shown in FIG. 2. It normally only takes about 6 lbs. valve tappet train force to deflect or spring the plate. Hence, even if the plate is initially perfectly flat the protruding nose will spring it slightly to the position shown.

In FIGS. 6A and 6B is shown a variation of the novel structure. More specifically, the push rod seat member 18a includes a peripheral rim 38a, surrounding an annular groove 40a, in turn surrounding the nose portion 42a, in turn surrounding the central passageway 26a. In this modified form, the slot 32a has a width about that of slot 32 in FIG. 7A, but extends clear across the nose portion annulus 34a so that the land portion is actually divided into two bridging parts completely straddling groove 32a. The land portions 42a' and 42a'' are completely separated from each other, directly opposite each other and astraddle both ends of the double radial or diametral slot. When the slot is formed clear across the annulus as shown here, it is not as deep as the radial slot shown in FIG. 7A. More specifically, it has been found that a slot depth of about 0.0013–0.0018 is adequate for proper lubricant flow. In this particular form, one slot edge boundary is shown to be directly on the true diameter of the push rod seat member, with the other offset therefrom and parallel thereto. If desired, the edges of this double radius slot also can straddle the true diameter, i.e. as in FIG. 7A only in double form to extend clear across the nose portion. This bridge type construction shown in FIGS. 6A and 6B also shows a marked improvement and greatly increased useful life over the operating useful life of the prior art device in FIGS. 5A and 5B. However, the flow rate did decrease more after 100 hours than the flow rate in the preferred form in FIGS. 7A and 7B. This is shown by the typical test results illustrated in FIG. 6C. It did have the extremely advantageous characteristic however, of the decrease in flow rate after 125 hours leveling off and not significantly decreasing thereafter. In both novel forms of the device, therefore, some small initial "wear-seating" of the sintered metal stock occurred and this was slightly greater in amount and extended over a longer time period in the lesser preferred form, but in both novel forms the decrease in flow rate during "wear-seating" is a relatively small and acceptable percentage of the total flow rate, and the decrease tapers off to very small values once this initial period is past, so that the total useful life of the assemblies are very substantial.

In this second form of the device in FIGS. 6A and 6B, it has been found that effective control of the tolerance variations in the metering disc is again obtained by having the nose portion protrude past the plane of rim 38a about the same amount as that of the device in FIGS. 7A and 7B.

Figure 1:
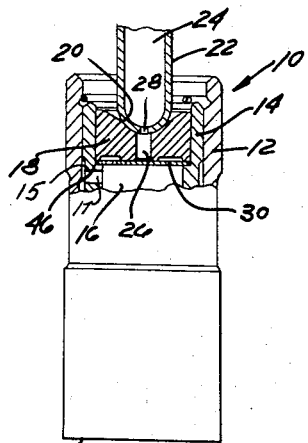
FIG. 1 is a side elevational, partially cutaway view of a tappet assembly employing this invention.

The lower portion of the tappet assembly not broken away in FIG. 1 may basically be like that shown in the lower portion of the tappet assembly shown in Patent No. 3,111,119, for example. This forms no part of the present invention and therefore is not described in detail.

Although the representative tests shown in FIGS. 5C, 6C and 7C are typical of the prior art and the two different forms of the improved construction, to illustrate the nature of the wear patterns in terms of flow rates, tests for 400–500 hours show the improved construction to continue effective operation over an extensively long useful life. It is conceivable that certain other advantages may be realized by those in this art upon studying this specification and disclosure. It is also conceivable that certain minor deviations of construction may be employed within the concept presented. Hence, the invention is intended to be limited only by the scope of the appended claims and the reasonably equivalent structures to those defined therein.

I claim:

1. Oil flow regulating means for a valve tappet that includes a tappet body, a hollow plunger in said body, a push rod seat member supported in said plunger and having a configurated inner end, said push rod seat member having an oil flow passageway with a terminus at said inner end, and having an annular nose around said passageway terminus and an annular groove around said nose, a metering disc retained against said nose, with passage means from one side of said disc to the other to allow regulated lubricant flow between said passageway and said hollow plunger member interior; the improvement comprising: said annular nose having a radially extending slot means therein from said passageway to said groove, with opposite edges extending generally in the same direction, and said annular nose having land portions with land areas positioned directly opposite each other astraddle of said slot means in a manner forming slot-bridging support means engaging said disc.

2. The regulating means in claim 1 wherein said slot means has generally parallel side edges adjoining said slot straddling land areas.

3. The regulating means in claim 2 wherein said slot means is a single radial slot.

4. The regulating means in claim 2 wherein said slot means is a double radial slot extending in opposite directions from said passageway to said groove to form unjoined slot-bridging land areas spaced by said slot means.

5. The regulating means in claim 3 wherein said slot has a depth of about 0.0030–0.0045 inch.

6. The regulating means in claim 4 wherein said slot has a depth of about 0.0013–0.0018 inch.

References Cited

UNITED STATES PATENTS

| Re. 25,974 | 3/1966 | Dadd | 123—90 |
| 2,732,832 | 1/1956 | Engemann | 123—90 |
| 2,795,218 | 6/1957 | Heiss | 123—90 |
| 3,111,119 | 11/1963 | Bergmann | 123—90 |
| 3,128,749 | 4/1964 | Dadd | 123—90 |

AL LAWRENCE SMITH, *Primary Examiner.*